INVENTOR
PETER L. RICHMAN

July 21, 1970

P. L. RICHMAN 3,521,164

RMS VOLTAGE MEASURING APPARATUS

Filed Jan. 3, 1968

INVENTOR
PETER L. RICHMAN

BY *Arnold, Roylance, Kruger & Durkee*
ATTORNEYS

United States Patent Office 3,521,164
Patented July 21, 1970

3,521,164
RMS VOLTAGE MEASURING APPARATUS
Peter L. Richman, Lexington, Mass., assignor to Weston Instruments, Inc., Newark, N.J., a corporation of Delaware
Filed Jan. 3, 1968, Ser. No. 695,485
Int. Cl. G01r 5/26
U.S. Cl. 324—106                                    6 Claims

ABSTRACT OF THE DISCLOSURE

RMS measuring apparatus including two heater-thermoelement converters with the thermoelements connected in series opposition. An input signal is connected to one heater. The thermoelement output is amplified by a difference amplifier and fed back to an auxiliary heater to obtain isothermal operation. In other embodiments the feedback is provided to one or both heaters with no auxiliary heater being used.

---

This invention relates to measuring apparatus and more specifically, to apparatus including thermal converters for comparing an input signal with a reference signal and obtaining a measure of the magnitude of the input signal.

In the past it has been found that the RMS (root-mean-square) value of an AC or DC input signal can be measured by applying the input signal to a heater which is thermally coupled to a thermocouple, thermistor or other thermally responsive element. The change in voltage, current or resistance of the thermally responsive element can be then measured and correlated with a known reference to give a measure of power dissipated in the heater and, with known heater characteristics, of the RMS value of the input signal.

One type of prior art circuit uses a pair of thermocouple converters in which the dissimilar metal junctions (the output terminals of the converters) are connected in series circuit relationship but poled in opposition to each other. The input signal is applied to the heater of one converter and the reference signal to the heater of the other. The algebraic sum of the two voltages is connected to a null type of meter (perhaps through an amplifier) and the input is attenuated by a calibrated attenuation device until the meter indicates no difference. The calibrations then constitute a measure of RMS value. By keeping the two converters in the same thermal environment correction for ambient changes is automatically accomplished. It will be apparent that amplification rather than attenuation can be used (or scaling followed by amplification) with the gain factor being a calibrated adjustment.

This prior art approach has two rather serious drawbacks. First, the thermal elements necessarily have a relatively long time constant and respond sluggishly to changes in the input (or reference) signal. This time constant depends on the total magnitude of the adjustment needed to reach null, i.e., the total operating temperature change through which the thermocouple must pass to reach the desired operating point. The time constant also depends, of course, on the physical characteristics of the converter itself.

The second disadvantage is the relative inability of the converters to respond, in a short time, to signals which exceed the reference level by a substantial amount.

An object of the present invention is to provide RMS measuring apparatus which responds quickly to changes in input level.

Another object is to provide measuring apparatus in which a thermal converter is used to accept an input signal and convert that signal to a form acceptable for comparison with a reference and in which a feedback loop provides essentially isothermal operation of the converter.

A further object is to provide apparatus having thermally responsive elements which are nonlinear in nature in which the elements are operated within a very narrow temperature range.

Yet another object is to provide measuring apparatus including substantially isothermally operated thermally responsive elements which are rendered insensitive to normally excessive signals.

The invention includes thermal converter means for accepting a signal input and for converting the signal into heat and again into a electrical signal representative of a characteristic of in the input signal. The converted signal is provided at one input of a comparison circuit. A second thermal converter accepts a reference signal, performs a similar conversion, and provides a signal to a second input of the comparison circuit. The result of the comparison is measured and is fed back to the input circuitry to maintain minimal temperature changes and to absorb the effect of large changes.

In order that the manner in which the foregoing and other objects are attained in accordance with the invention can be understood in detail, particularly advantageous embodiments thereof will be described with reference to the accompanying drawings, which form a part of this specification and wherein.

Figure 1:
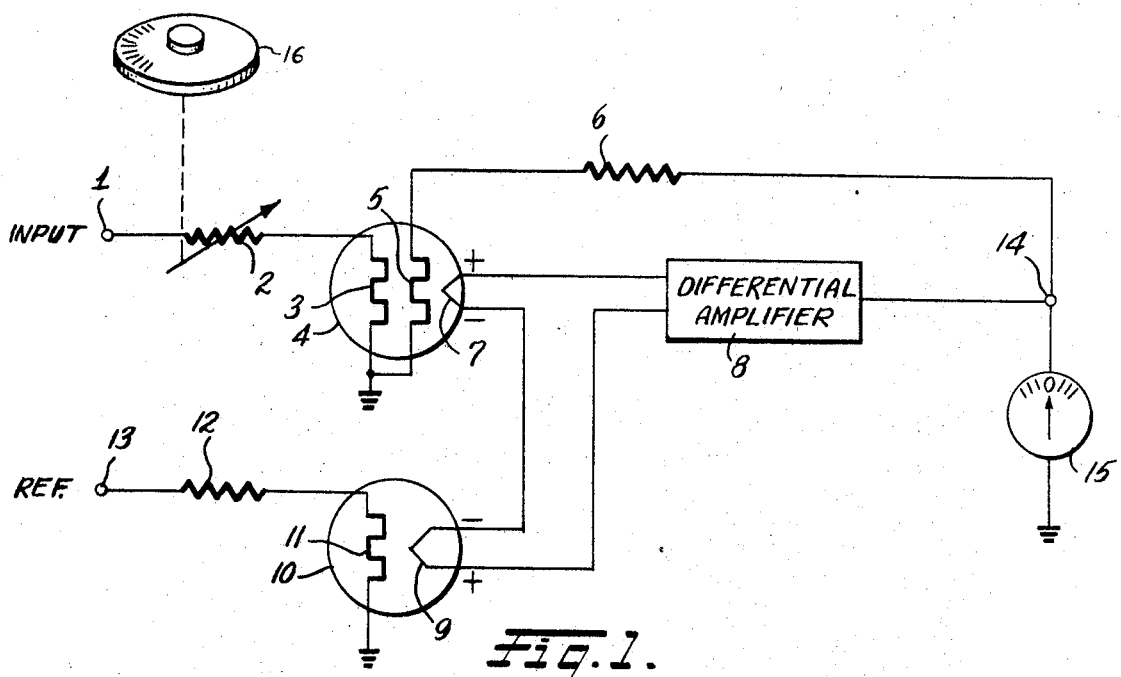
FIG. 1 is a schematic diagram of one embodiment of the invention.

The embodiment shown in FIG. 1 includes an input terminal 1 to which the input signals to be measured can be applied. These signals can be direct or alternating current and need not have any particular waveform or crest factor. Terminal 1 is connected to one terminal of a variable resistor 2 the other terminal of which is connected to one terminal of a heater element 3 within a first thermal converter 4. The adjustable element of resistor 2 is mechanically coupled to a manually adjustable calibrated knob 16. The other terminal of heater 3 is connected to a point of reference potential such as ground.

Converter 4 is also included with a heater element 5, one terminal of which is connected to ground and the other terminal of which is connected to one terminal of a fixed feedback resistor 6. A conventional thermocouple junction 7 is disposed in converter 4 in good heat transfer relationship with both of heaters 3 and 5. As is well known to those skilled in the art, a thermocouple responds to the influx of heat energy to generate a DC voltage. The positive terminal of thermocouple 7 is connected to one input terminal of a differential amplifier circuit 8. The other input terminal of amplifier circuit 8 is connected to the positive terminal of a thermocouple 9 which is disposed within a thermal converter 10 in good heat transfer relationship with a heater element 11. One terminal of element 11 is connected to ground and the other terminal is connected through a fixed input resistor 12 to a reference input terminal 13. Input terminal 13 can be connected to a source of reference voltage with which the input voltage is to be compared.

It will be recognized that the thermal converters described above usually comprise one or more resistive heater elements, as schematically shown, together with one or more thermocouple junctions or other thermally responsive devices. In the circuit of FIG. 1, the negative output terminals of the thermocouples in converters 4 and 10 are connected together, forming a series circuit with the thermocouples in series opposition. With this arrangement, assuming a relatively close match between thermocouple characteristics, the voltage which appears at the input terminals of amplifier 8 is representative of a difference in temperature between the junctions of thermocouples 7 and 9. Thus, if the two junctions are heated to precisely the same temperature, no input signal is provided to amplifier 8. However, if no signal is applied to the heaters of converter 4 and a signal is applied to heater 11 of converter 10, the voltage produced by thermocouple 9 will be greater than that produced by thermocouple 7 and a DC input signal is applied to differential amplifier 8.

Amplifier 8 responds by producing an output voltage representative of the input signal, i.e., the difference between junction temperatures. The output of amplifier 8 appears at an output terminal 14 and produces a feedback current through the feedback circuit including resistor 6. An indicating device such as a zero center null meter 15 is connected to output terminal 14 to indicate the presence of an output signal and, hence, a difference between the junction temperatures of the thermocouple junctions.

In the operation of FIG. 1, assume first that the reference current is applied to terminal 13, heating heater 11 and junction 9 to produce an output voltage at the output terminals of junction 9. Assume further that no input signal is provided at terminal 1. In these circumstances, no heat is generated by heater 3 and no voltage is produced by thermocouple 7. The difference between the voltages generated by thermocouples 9 and 7 is therefore maximum and the input signal to differential amplifier 8 causes a substantial output voltage to occur at output terminal 14. A relatively large feedback current therefore flows through resistor 6 and causes resistive heater 5 to generate a significant quantity of heat, causing an output from thermocouple 9. The steps described do not, of course, take place in a clear sequence. Rather, when the equipment is first energized, the heating of thermocouple 9, the input to differential implifier 8, the feedback current to heater 5 and the counter-balancing output of thermocouple 7 all take place concurrently and gradually. However, the value of resistor 6 and the characteristics of amplifier 8 are such that a complete balance is never reached. Thus, after some period of initial warmup time, an equilibrium state is reached at which thermocouples 7 and 9 are both producing voltages but not at exactly counterbalancing levels. Enough current is provided through resistor 6 to maintain thermocouple 7 at an operating temperature near the selected temperature. Meter 15 indicates an unbalance by the needle of the meter being displaced from zero. However, the unbalance is relatively small so that meter 15 can be a quite sensitive meter.

Now assume that an input signal is supplied to terminal 1. It will be apparent that the combined heating of heaters 3 and 5 will cause thermocouple 7 to tend to produce more voltage which tends to counterbalance the voltage produced by thermocouple 9. The difference at the input terminals of amplifier 8 is therefore decreased, but, because of the large amplification factor, the feedback through resistor 6 is decreased to the point where insufficient heat is generated by heater 5 to maintain this near equilibrium condition. An unbalance is nevertheless still indicated so that an operator can slowly reduce the value of resistor 2 until the heat produced by heater 5 is practically nonexistent, due to the continued decrease of feedback current through resistor 6. The diminished heat generated by resistor 5 is now supplied by resistor 6. As resistance 2 is adjusted, a point is reached at which the RMS value of the signal applied to terminal 1 equals that applied to terminal 13. At this point, the voltages produced by thermocouples 9 and 7 are equal, the signal applied to differential amplifier 8 is zero, and the voltage appearing at output terminal 14 is also zero as indicated to the operator by meter 15. The value of the signal applied at input terminal 1 is therefore known to be a function of the resistance 2 and can be read from the appropriately calibrated knob 16 to which the adjustable portion of resistance 2 is mechanically coupled.

It will be recognized that resistance 2 can be replaced by an amplifier having an adjustable amplification factor, the adjustable elements of which can be coupled to a suitably calibrated knob. Also, resistance 2 would normally include a range changing switch including a multiple position single pole switch and a plurality of precision fixed resistors in addition to a continually adjustable element so that the apparatus can be used for input signals over a large range of values.

It will be recognized, that the apparatus described with reference to FIG. 1 is capable of accepting AC or DC inputs and that the thermal lag in the thermocouple junctions thereof is diminished to the extent that practically instantaneous response is obtainable.

However, one disadvantage exists in the circuit of FIG. 1 in that the application of a large excess voltage temporarily applied to input terminal 1 can overheat thermocouple 7 to the point that the compensating feedback circuit cannot maintain the isothermal condition simply because it is impossible for the compensating circuits to supply "negative power." Thus, if the apparatus is operated by an unskilled person, or is carelessly used, a situation can be introduced in which the response is again sluggish due to thermal lag.

Figure 2:
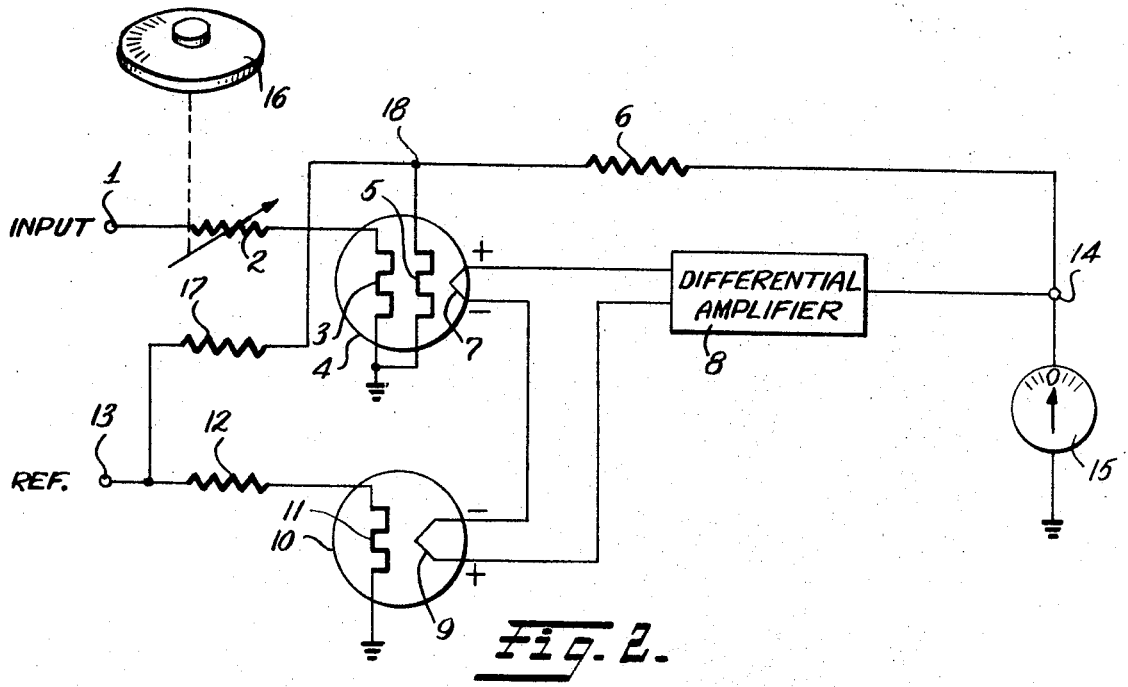
FIGS. 2 and 3 are schematic diagrams of two further embodiments of the invention.

The circuit of FIG. 2 provides means for correcting this problem to some extent. The circuit includes all of the elements described in FIG. 1, these elements being identified by the same reference numerals. The additional feature includes a resistor 17 one terminal of which is connected to a junction 18 between resistor 6 and heating resistor 5 and the other terminal being connected to reference terminal 13. With no input signal applied to terminal 1, some heating current flows from the reference source through resistor 17 to heater 5. In addition, some heating current flows through the feedback circuit including resistor 6 to heater 5. Thermocouple 7 receives the heat generated by heater 5 as discussed with reference to FIG. 1 and establishes a feedback current sufficient to maintain the thermocouple at the desired operating point. However, because of the current flowing through resistor 17 the feedback current required to maintain the heating level is now more than in the circuit of FIG. 1 since the currents through resistors 6 and 17 are now summed at junction 18, the current through resistor 17 being in the opposite polarity from that resulting from the output voltage from the amplifier. The system is now capable of supplying what amounts to "negative power" to heater 5 merely by subtracting from the positive power normally introduced through resistor 6. Thus, within limits, the circuit of FIG. 3 is now capable of withstanding an excess voltage without introducing the undesirable sluggish operation inherent in excessive temperature excursions of the thermocouple.

Figure 3:
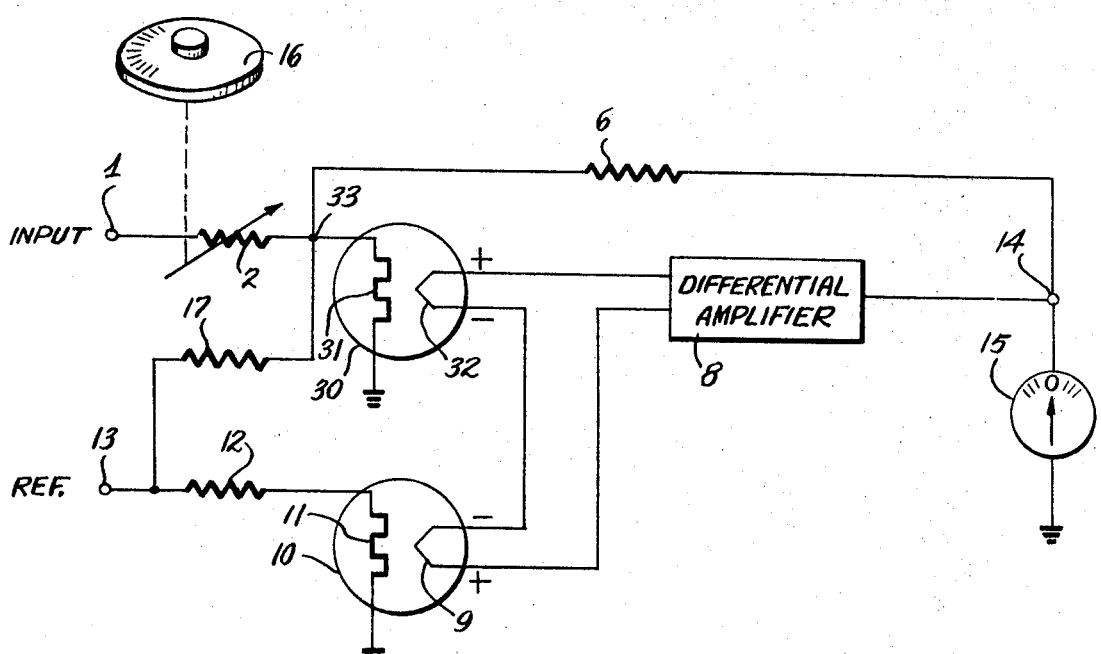

FIG. 3 shows an additonal embodiment of the invention in which input terminals 1 and 13, input resistors 2 and 12, thermoconverter 10, amplifier 8, and meter 15 are connected essentially as in FIGS. 1 and 2. However, FIG. 3 includes a thermoconvertor 30 which has a single heating element 31 and a thermocouple 32 disposed in good heat transfer relationship with heater 31. Heater 31 is energized by current provided at a summing junction 33 to which input resistor 2, feedback resistor 6 and compensating resistor 17 are all connected. Thermocouple 32 is again connected in series opposing relationship with thermocouple 9, the difference voltage between the two thermocouples being connected to the input terminals of amplifier 8.

The operation of the circuit of FIG. 3 is essentially the same as the operation of the circuit of FIG. 2 except that it is necessary that the input signal be limited to AC signals because of the direct summation of the input current through resistor 2 with the currents supplied through resistors 17 and 6, both of which are DC currents. The heating current provided through resistor 2 is supplemented by that provided through resistors 6 and 17 to maintain the heat generated by heater 30 at a level adequate to maintain the temperature of thermocouple 32 at the desired point. As in FIG. 2, an excess voltage can be again compensated for by subtracting unwanted feedback current through resistor 17, supplying the funcitonal equivalent of negative power to the heating operation.

While certain advantageous embodiments have been chosen to illustrate the invention it will be understood by those skilled in the art that various changes and modifications can be made therein without departing from the scope of the invention as defined in the appended claims.

What is claimed is:

1. Measuring apparatus comprising the combination of input circuit means connectable to a source of electrical signals to be measured; a first thermal converter including first heat dissipating resistor means and a first thermally responsive element thermally coupled to said first resistor means; a second thermal converter including second heat dissipating resistor means and a second thermally responsive element thermally coupled to said second resistor means; circuit means connected to said second resistor means and to a source of reference potential for providing thermal energy to said second resistor means; third resistor means coupling said reference source to said first resistor means to provide a current heating path therebetween; a differential amplifier circuit means having a pair of input terminals for accepting plural input signals and an output terminal; circuit means interconnecting said first and second thermally responsive elements and said pair of input terminals for providing at said output terminal an electrical signal representative of the difference in temperature between said elements; feedback circuit means including a feedback resistor for feeding back said output signal from the amplifier output terminal to said first resistor means; and an indicating device connected to said amplifier means output terminal for indicating the magnitude of the signal at said otuput terminal thereof.

2. Apparatus according to claim 1 wherein said input means comprises a variable resistor.

3. Apparatus according to claim 1 wherein said first heat dissipating circuit means comprises first and second heater elements, said first heater element being connected between said input circuit means and ground, and said second heater element being connected between said feedback circuit means and ground.

4. Apparatus according to claim 1 wherein each of said first and second thermally responsive elements comprises a junction of dissimilar metals forming a thermocouple having a polarized output, and said circuit means interconnecting said elements is arranged to connect said thermocouples in series opposing circuit relationship, the extremes of the series circuit thus formed being connected to said pair of amplifier input terminals.

5. Apparatus according to claim 1 wherein said indicating device comprises a zero-center null meter coupled between the said amplifier output terminal and said source of reference potential.

6. Apparatus according to claim 1 wherein said input means includes an input resistor, a current summing junction at one end of said input resistor, said feedback resistor coupling said amplifier output terminal to said junction and said third resistor coupling said source of reference potential to said junction.

References Cited

UNITED STATES PATENTS

| 1,121,835 | 12/1914 | Hiatt | 324—106 |
| 3,159,787 | 12/1964 | Sexton et al. | 324—123 XR |
| 3,213,364 | 10/1965 | Miller et al. | 324—106 XR |
| 3,399,348 | 8/1968 | Praglin et al. | 324—106 XR |

RUDOLPH V. ROLINEC, Primary Examiner

E. F. KARLSEN, Assistant Examiner

Disclaimer and Dedication 3,521,164.—*Peter L. Richman*, Lexington, Mass. RMS VOLTAGE MEASURING APPARATUS. Patent dated July 21, 1970. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]